(12) United States Patent
Ramachandran et al.

(10) Patent No.: US 9,886,215 B1
(45) Date of Patent: Feb. 6, 2018

(54) MECHANISM FOR PROVIDING BLOCK STORAGE AND OBJECT STORAGE FUNCTIONALITY FROM AN EXTERNAL STORAGE ENVIRONMENT TO A NETWORKED VIRTUALIZATION ENVIRONMENT FOR STORAGE MANAGEMENT

(71) Applicant: Nutanix, Inc., San Jose, CA (US)

(72) Inventors: Parthasarathy Ramachandran, Palo Alto, CA (US); Binny Sher Gill, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 197 days.

(21) Appl. No.: 14/279,139

(22) Filed: May 15, 2014

(51) Int. Cl.
*G06F 12/00* (2006.01)
*G06F 3/06* (2006.01)

(52) U.S. Cl.
CPC .............. *G06F 3/067* (2013.01); *G06F 3/065* (2013.01); *G06F 3/0619* (2013.01)

(58) Field of Classification Search
CPC ......... G06F 3/067; G06F 3/065; G06F 3/0619
See application file for complete search history.

(56) References Cited

U.S. PATENT DOCUMENTS

| 8,549,518 | B1 | 10/2013 | Aron et al. | |
|---|---|---|---|---|
| 8,601,473 | B1 | 12/2013 | Aron et al. | |
| 8,850,130 | B1 | 9/2014 | Aron et al. | |
| 2010/0169589 | A1* | 7/2010 | Jalali .................... | G06F 11/2071 711/162 |
| 2010/0228913 | A1* | 9/2010 | Czezatke ............ | G06F 11/1451 711/112 |
| 2011/0047542 | A1* | 2/2011 | Dang ...................... | G06F 9/468 718/1 |
| 2011/0106767 | A1* | 5/2011 | Zane .................. | G06F 17/30445 707/645 |
| 2013/0007436 | A1* | 1/2013 | Bookman ......... | G06F 17/30233 713/2 |
| 2013/0036323 | A1* | 2/2013 | Goose ................. | G06F 11/1484 714/4.11 |
| 2015/0269032 | A1* | 9/2015 | Muthyala ............ | G06F 11/1464 707/639 |

OTHER PUBLICATIONS

Baron, Joseph, et al., "Storage Options in the AWS Cloud" Amazon web services, Oct. 2013, 34 pages.
(Continued)

*Primary Examiner* — Gurtej Bansal
(74) *Attorney, Agent, or Firm* — Vista IP Law Group, LLP

(57) ABSTRACT

A method for providing backup to a networked virtualization environment for storage management by a remote storage environment having a block storage device and an object storage device, includes deploying a controller virtual machine at the remote storage environment, wherein the controller virtual machine provides a block storage device interface, receiving, at the controller virtual machine, a write request for data in a block-based format, translating the data from the block-based format to an object-based format, writing the data in the object-based format to the object storage device, and updating metadata corresponding to the write request in the block storage device.

36 Claims, 8 Drawing Sheets

(56) References Cited

OTHER PUBLICATIONS

Le Goaller, Jean-Pierre, et al., "RDBMS in the Cloud: Oracle Database on AWS", Oct. 2013, 33 pages.
Open Grid Forum (OGF) and Storage Networking Industry Association (SNIA), "Cloud Storage for Cloud Computing", Copyright 2009, 12 pages.
Ranjan, R. Arokia Paul, "Evolution of Cloud Storage as Cloud Computing Infrastructure Service", IOSR Journal of Computer Engineering (IOSRJCE), ISSN: 2278-0661, vol. 1, Issue 1, May-Jun. 2012, 8 pages.
Diversity Limited, "Understanding the Cloud Computing Stack, SaaS, Paas, IaaS", Copyright 2011, 20 pages.
Chappell, David, "A Short Introduction to Cloud Platforms", An Enterprise-Oriented View, David Chappell & Associates, Copyright 2008, 13 pages.

\* cited by examiner

FIG. 3
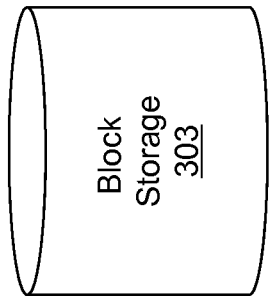
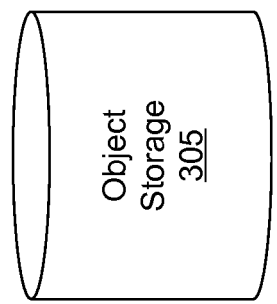

MECHANISM FOR PROVIDING BLOCK STORAGE AND OBJECT STORAGE FUNCTIONALITY FROM AN EXTERNAL STORAGE ENVIRONMENT TO A NETWORKED VIRTUALIZATION ENVIRONMENT FOR STORAGE MANAGEMENT

CROSS-REFERENCE TO RELATED APPLICATIONS

The present application is related to U.S. Pat. No. 8,601,473, entitled "ARCHITECTURE FOR MANAGING I/O AND STORAGE FOR A VIRTUALIZATION ENVIRONMENT", U.S. Pat. No. 8,850,130, entitled "METADATA FOR MANAGING I/O AND STORAGE FOR A VIRTUALIZATION ENVIRONMENT", U.S. Pat. No. 8,549,518, entitled "METHOD AND SYSTEM FOR IMPLEMENTING A MAINTENANCE SERVICE FOR MANAGING I/O AND STORAGE FOR A VIRTUALIZATION ENVIRONMENT", which are all hereby incorporated by reference in their entirety.

FIELD

This disclosure concerns a mechanism for providing block storage and object storage functionality from an external storage environment to a clustered environment for storage management.

BACKGROUND

In a networked virtualization environment for storage management, also referred to as a clustered environment for storage management, several nodes (e.g., servers, data centers) share a plurality of storage devices over a network. Each node may include local storage devices (e.g., solid state drive (SDD)) and the clustered environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Each node may host several user virtual machines, and virtual disks may be exposed by a node to its corresponding user virtual machines. In order to provide for disaster recovery and for backup purposes, it may be necessary for the networked virtualization environment for storage management to utilize an external storage environment for storage of user virtual machine data.

Conventionally, external storage environments provide two types of storage devices namely block storage and object storage. For a networked virtualization environment that utilizes a block-based system for storage, data will typically be written to the block storage device of the external storage environment for backup and recovery purposes. However, block storage devices residing at the external storage environment are not always reliable and do not necessarily provide optimal storage characteristics for backing up a clustered environment for storage management.

Block storage devices and object storage devices each have unique characteristics that may make them more or less desirable depending on the particular application.

Block storage devices include the characteristics of allowing overwrites on data, providing functionality to legacy applications and immediate consistency of data written to the block storage device. However, at the same time, block storage devices are not highly scalable, suffer from low reliability and are not highly available. Additionally, block storage devices are provided on a provisioning-basis, where a fixed amount of block storage is purchased upfront regardless of how much is actually used.

Object storage devices include the characteristics of being scalable, highly reliable and highly available. However, at the same time, object storage devices do not provide for overwrites (e.g., are write-once), suffer from latency and do not provide for immediate consistency of data written to the object storage device. On the other hand object storage devices are provided on a per-use basis, where storage is paid for only as it is consumed, such that a user of the object storage device is only charged for how much is actually used.

Therefore, what is needed is a mechanism for providing a block storage interface to the clustered environment for storage management while utilizing both block storage and object storage functionality from an external storage environment.

SUMMARY

Embodiments of the present invention illustrate a mechanism for providing block storage and object storage functionality from an external storage environment to a networked virtualization environment for storage management.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to accompanying drawings. However, the drawings depict only certain embodiments of the invention, and should not be taken as limiting the scope of the invention.

FIG. 3 illustrates an example of an external storage environment.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

Embodiments of the present invention illustrate a mechanism for providing a block storage interface to the clustered environment for storage management while utilizing both block storage and object storage functionality from an external storage environment.

In a networked virtualization environment for storage management, also referred to as a clustered environment for storage management, several nodes (e.g., servers, data centers) share a plurality of storage devices over a network. Each node may include local storage devices (e.g., solid state drive (SDD)) and the clustered environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Each node may host several user virtual machines, and virtual disks may be exposed by a node to its corresponding user virtual machines.

Figure 1:
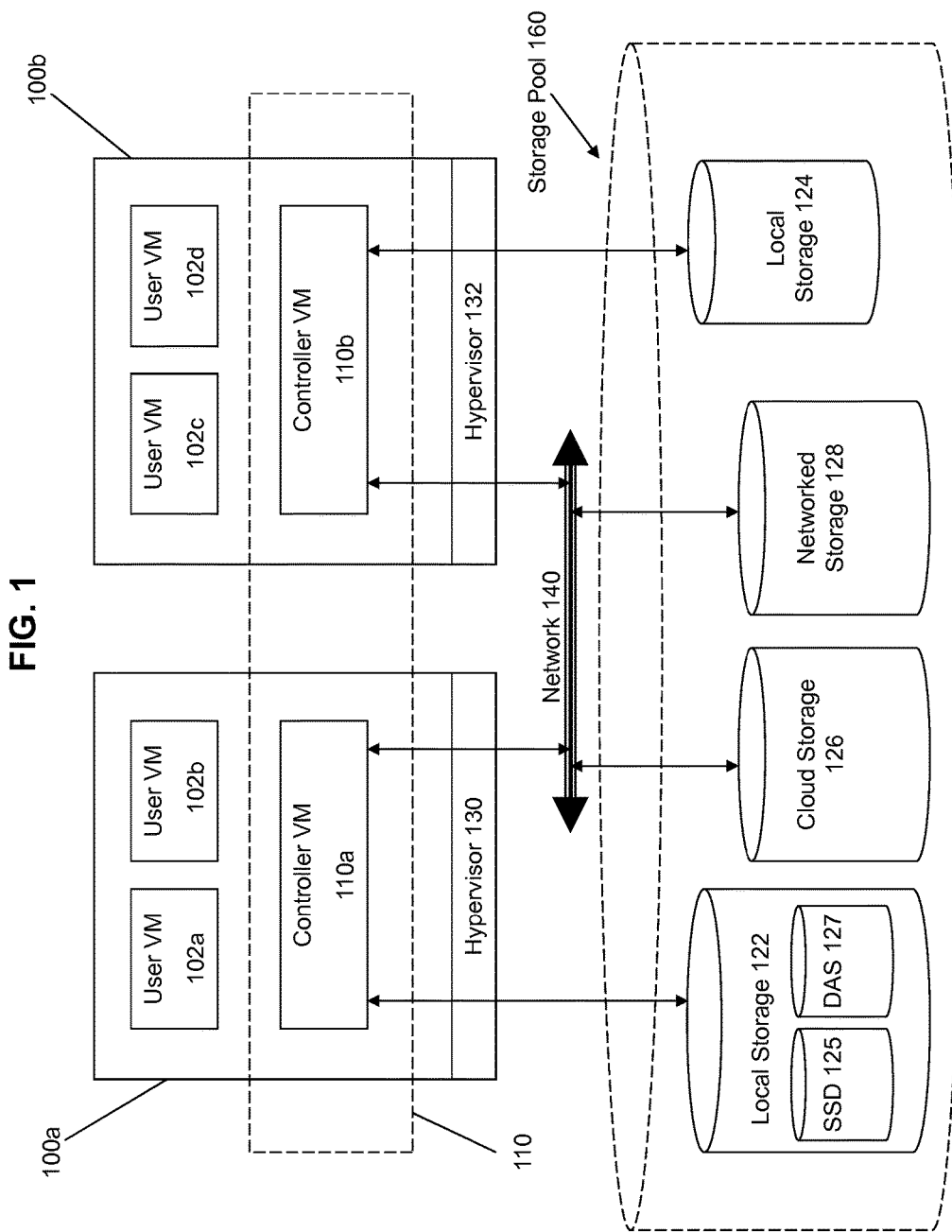
FIG. 1 illustrates an architecture for implementing storage management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. The multiple tiers of storage includes storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

Additional details regarding networked virtualization environments for storage management are described in U.S. Pat. No. 8,601,473, entitled "Architecture for Managing I/O and Storage for a Virtualization Environment", which is hereby incorporated by reference in its entirety.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will includes its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
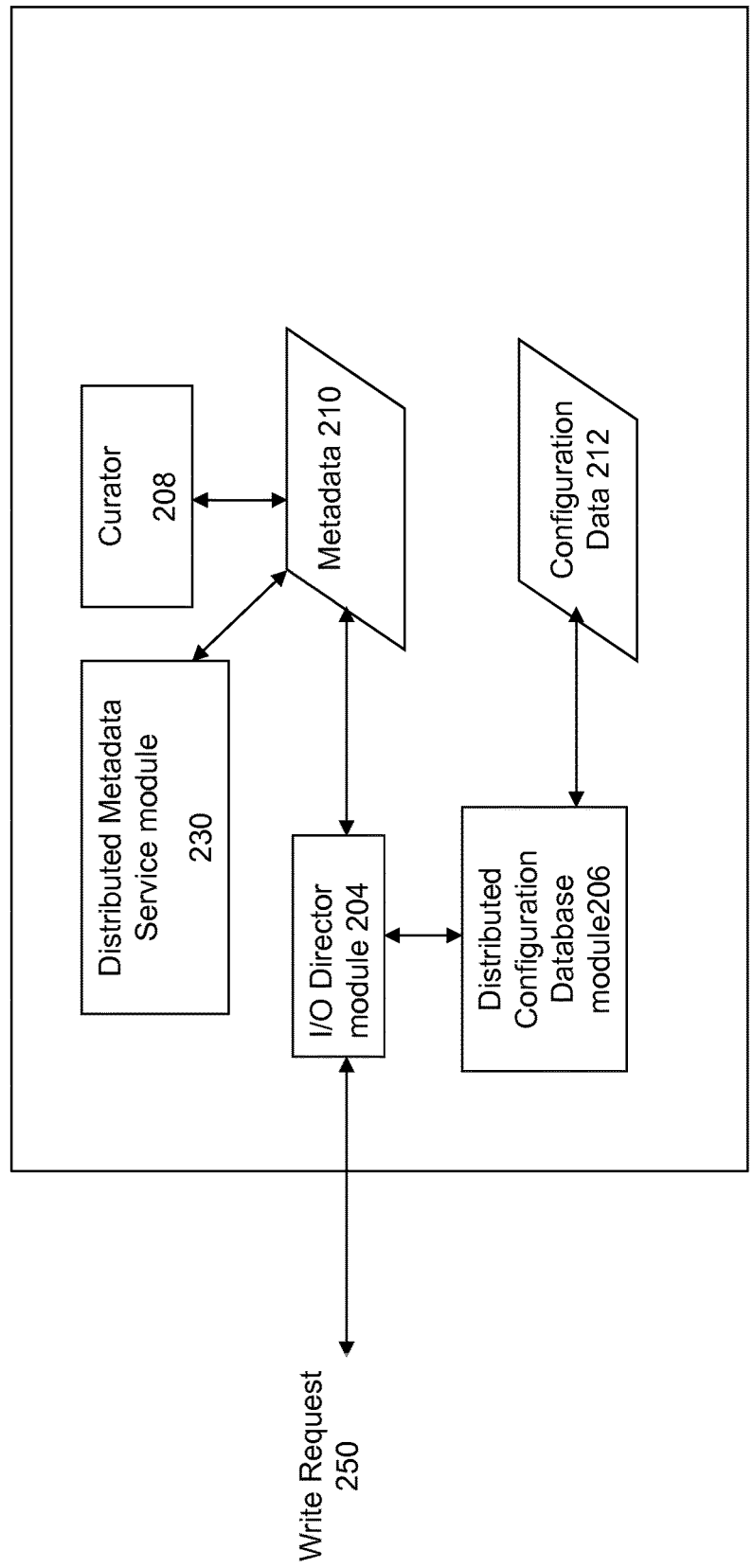
FIG. 2 illustrates the internal structures of a Controller VM according to some embodiments of the invention.

FIG. 2 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 204 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the Controller VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Controller VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Controller VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in U.S. Pat. No. 8,850,130, which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in U.S. Pat. No. 8,549,518, which is hereby incorporated by reference in its entirety.

Some of the Controller VMs also includes a Distributed Configuration Database module 206 to handle certain administrative tasks. The primary tasks performed by the Distributed Configuration Database module 206 are to maintain configuration data 212 for the Controller VM and act as a notification service for all events in the distributed system. Examples of configuration data 212 include, for example, (1) the identity and existence of vDisks; (2) the identity of Controller VMs in the system; (3) the physical nodes in the system; (4) the physical storage devices in the system; and (5) information pertaining to updates and upgrades available for the system.

For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would handled by the Distributed Configuration Database module 206 to update the configuration data 212 so that other entities in the system can be made aware of these configuration changes. As another example, whenever a new upgrade version is available for the system, the Distributed Configuration Database module 206 would be informed of the new upgrade version, after which the configuration data 212 is updated to reflect this information so that all other entities in the system can then be made aware of the existence of the new upgrade version.

Another task that is handled by the Distributed Configuration Database module 206 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 206 also handles elections and consensus management within the system. Another task handled by the Distributed Configuration Database module is to implement ID creation. Unique IDs are generated by the Distributed Configuration Database module as needed for any required objects in the system, e.g., for vDisks, Controller VMs, extent groups, etc. In some embodiments, the IDs generated are 64-bit IDs, although any suitable type of IDs can be generated as appropriate for embodiment so the invention. According to some embodiments of the invention, the Distributed Configuration Database module 206 may be implemented on an SSD storage because of the real-time guarantees required to monitor health events.

In order to provide for disaster recovery and for backup purposes, it may be necessary for the networked virtualization environment for storage management to utilize an external storage environment for storage of user virtual machine data.

FIG. 3 illustrates an example of an external storage environment. The external storage environment provides two types of storage devices namely block storage devices 303 and object storage devices 305. Typically, for a networked virtualization environment that utilizes a block-based system for storage, data will be written to the block storage device of the external storage environment for backup and recovery purposes. However, block storage devices residing at the external storage environment are not always reliable and do not necessarily provide optimal storage characteristics for backing up a clustered environment for storage management.

Block storage devices 303 and object storage devices 305 each have unique characteristics that may make them more or less desirable depending on the particular application.

Block storage devices 303 include the characteristics of allowing overwrites on data, providing functionality to legacy applications and immediate consistency of data written to the block storage device. However, at the same time, block storage devices 303 are not highly scalable, suffer from low reliability and are not highly available. Additionally, block storage devices 303 are provided on a provisioning-basis, where a fixed amount of block storage is purchased upfront regardless of how much is actually used. The lack of reliability and availability at the block storage devices is especially problematic where the external storage environment is being utilized for backup purposes because the temporary unavailability of backup data may be unacceptable to the clustered environment for storage management.

Object storage devices 305, on the other hand, include the characteristics of being scalable, highly reliable and highly available. However, at the same time, object storage devices 305 do not provide for overwrites (e.g., are write-once), suffer from latency and do not provide for immediate consistency of data written to the object storage device. On the other hand object storage devices 305 are provided on a per-use basis, where storage is paid for only as it is consumed, such that a user of the object storage device is only charged for how much is actually used. Moreover, the high-reliability and availability of object storage devices are very desirable characteristics for purposes of providing backup to the clustered storage environment.

Thus, it would be advantageous for the networked virtualization environment for storage management to take advantage of the high reliability and availability of the object storage devices while still retaining some of the desirable attributes of the block storage device in order to leverage the beneficial characteristics of both types of storage devices.

Figure 4:
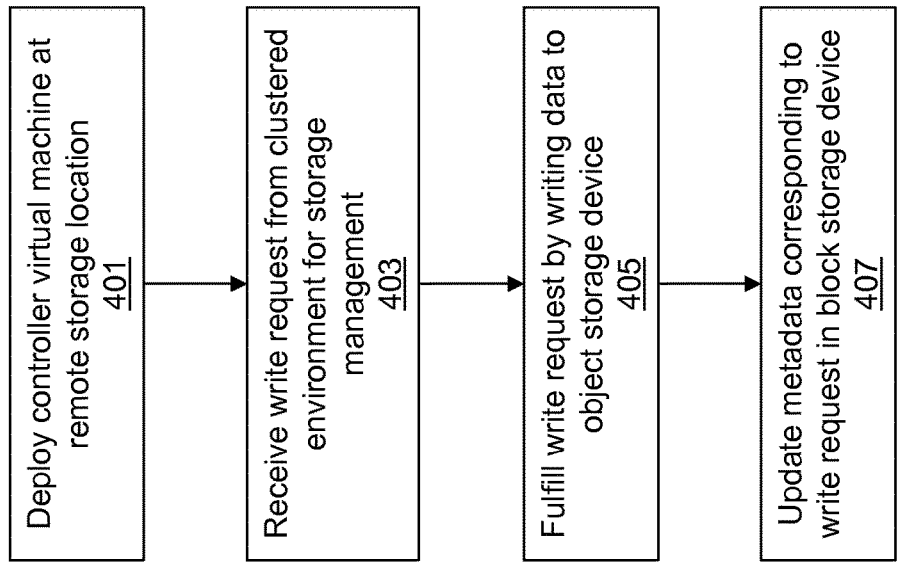
FIG. 4 is a flow diagram illustrating a method for providing block storage functionality and object storage functionality of an external storage environment to a networked virtualization environment for storage management according to some embodiments.

FIG. 4 is a flow diagram illustrating a method for providing block storage functionality and object storage functionality of an external storage environment to a networked virtualization environment for storage management according to some embodiments.

Initially a Controller VM is deployed at the remote storage location as shown at 401. The Controller VM is deployed such that I/O requests initiating from the networked virtualization environment for storage management and targeting the remote storage environment are passed to the Controller VM at the remote storage environment prior to being fulfilled.

One or more Controller VMs may be deployed at the remote storage environment for servicing one or more networked virtualization environments for storage management. In some embodiments, a single Controller VM deployed at the remote storage environment may service all of the Controller VMs residing at the networked virtualization environment for storage management. In other embodiments, a different Controller VM may be deployed at the remote storage environment for each Controller VM residing at the networked virtualization environment for storage management.

These only provide example configurations for deploying Controller VMs at the remote storage environment. One ordinarily skilled in the art will recognize that any number of configurations including one-to-one, one-to-many, or many-to-one may exist between Controller VMs residing at the networked virtualization environment and Controller VMs deployed at the remote storage environment.

The Controller VM deployed at the remote storage environment communicates with Controller VMs residing at the networked virtualization environment in order to determine which user virtual machines are associated with which vDisks. The Controller VM deployed at the remote storage environment is associated with an IP address that is utilized by the Controller VMs at the networked virtualization environment to facilitate communication. The Controller VM deployed at the remote storage environment also maintains a copy of the metadata that is utilized to provide storage management functionality to user virtual machines residing at the networked virtualization environment.

The networked virtualization environment for storage management may utilize a block-based storage system, such that data being managed within the networked virtualization environment for storage management utilizes a block-based format that is suitable for storage in a block storage device. The controller VMs deployed at the remote storage environment provides a block-based interface to the controller VMs at the networked virtualization environment for storage management. The controller VMs deployed at the remote storage environment appear as block storage devices to the controller VMs at the networked virtualization environment such that the controller VMs at the networked virtualization environment believe that they are writing to a block-storage device when they employ the remote storage environment for backup purposes.

Alternatively, the networked virtualization environment for storage management may utilize a file-based format or other proprietary storage format. In such circumstances, the controller VMs deployed at the remote storage environment may provide an interface for first translating file-based or proprietary format based write requests into a block-based write request for the block-based interface of the controller VM, and then handling the blocked-based write request in a manner that allows the object storage device and block storage device of the remote storage environment to be utilized.

In order to most optimally utilize the block storage devices and object storage devices at the remote storage server, the Controller VM deployed at the remote storage environment is configured to initially maintain metadata using the block storage device and user virtual machine data using the object storage device. Thus, the copy of metadata maintained by the Controller VM is initially stored in the block storage devices of the remote storage environment and the user virtual machine data maintained by the Controller VM at the remote storage environment is translated from a block-based format to an object-based format and stored in the object storage devices.

The metadata maintained at the block storage device is also periodically snapshotted and converted into an object-based format for storage at the object storage device. Storing both the user virtual machine data and corresponding metadata (after it is snapshotted) at the object storage devices of the remote storage environment rather than the block storage devices allows the user virtual machine data and corresponding metadata to be maintained in a highly reliable and highly available fashion.

After the Controller VM has been deployed at the remote storage environment, a write request from the networked virtualization environment is received as shown at 403. A Controller VM residing at the networked virtualization environment may receive a write request from a corresponding user virtual machine and determine that the write request should be replicated at the remote storage environment. The Controller VM at the networked virtualization environment then utilizes its metadata to locate a corresponding Controller VM at the remote storage environment, where it forwards the write request. As mentioned above, the networked virtualization environment may utilize a block-based storage system, a file-based storage system or other proprietary format based storage system, and the controller VM at the remote storage environment may employ an interface for translating the write request from the networked virtualization environment into a block-based format for the block storage device interface provided by the controller VM.

In response to receiving the write request, the Controller VM at the remote storage environment fulfills the request by first translating the data associated with the write request into a block-based format (where necessary) and then translating the data associated with the write request from the block-based format to an object-based form before writing the data to the object storage device as shown at 405. Because the object storage device employs a write-once policy, each time a write request is fulfilled, the object storage device creates a new object for fulfilling the write request rather than overwriting the original object.

After fulfilling the write request by translating the data from a block-based format to an object-based format and writing the data to the object storage device, the Controller VM residing at the remote storage environment updates the metadata stored at the block storage device to account for the newly fulfilled write request as shown at 407. The Controller VM residing at the remote storage environment then returns to 403, where it waits to receive another write request from the networked virtualization environment for storage management.

By deploying a Controller VM at the remote storage environment for servicing a networked virtualization environment for storage management, both block storage functionality and object storage functionality may be provided to the networked virtualization environment. Metadata initially stored using the block storage device benefits from the characteristics of block storage devices while user virtual machine data translated from a block-based format to an object-based format and stored using the object storage device benefits from the characteristics of object storage devices (e.g., high availability and high reliability).

Because metadata consumes much less storage space than actual user virtual machine data, storing metadata using the block storage device does not require a large amount of provisioning, and may thereby reduce costs. Additionally, storing the user virtual machine data using the object store device allows for a user to only pay for storage as necessary rather than having to incur a large upfront overhead for storage space that may not necessarily be used.

Figure 5:
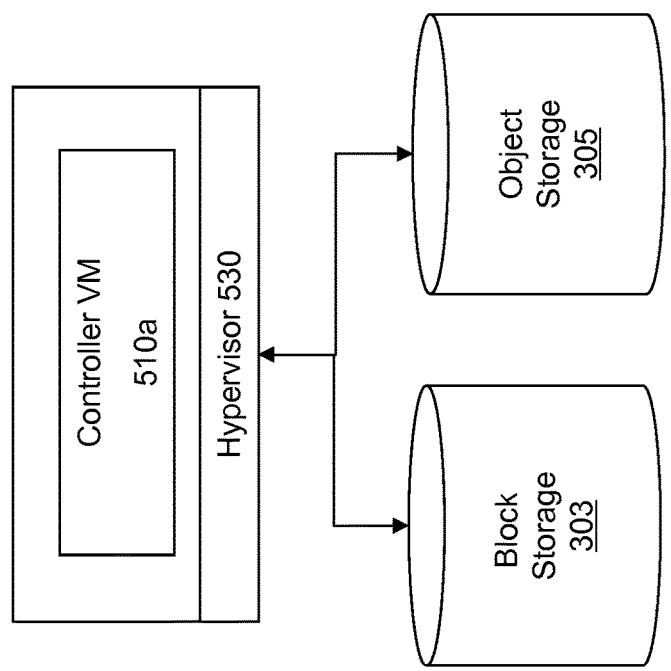
FIG. 5 is a schematic diagram illustrating a Controller VM deployed at the remote storage environment according to some embodiments.

FIG. 5 is a schematic diagram illustrating a Controller VM deployed at the remote storage environment according to some embodiments. The Controller VM 510*a* may reside within a virtualization environment exposed by a hypervisor 530 that resides on top of the remote storage environment. In some embodiments, the Controller VM 510*a* may communicate directly with the block storage device 303 without having to utilize an API. In some embodiments, the Controller VM 510a may communicate with the object storage device 305 using an API provided by the object storage device 305.

Although FIG. 5 illustrates a single controller VM deployed at the remote storage environment, it is important to note that any number of controller VMs may be deployed at the remote storage environment for providing storage functionality to any number of controller VMs residing within any number of networked virtualization environments.

Figure 6:
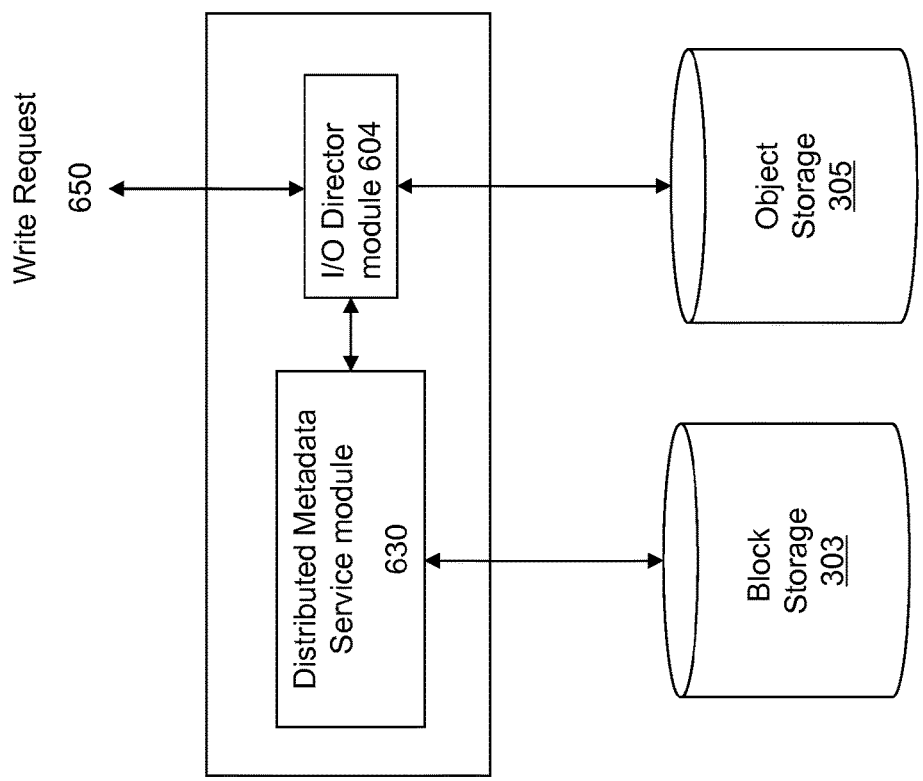
FIG. 6 is a more detailed view of the Controller VM deployed at the remote storage environment.

FIG. 6 is a more detailed view of the Controller VM deployed at the remote storage environment. The Controller VM may include any of the modules described above in FIG. 2, however for purposes of illustration, the Controller VM deployed at the remote storage environment will only be depicted as including an I/O director module 604 and a distributed metadata service module 630.

Much like the I/O director module of FIG. 2, the I/O director module 604 of the controller VM residing at the remote storage environment is used to direct I/O from the world of virtual disks to the pool of physical storage resources. In some embodiments, the I/O Director module implements the iSCSI or NFS protocol server.

A write request 650 received from the networked virtualization environment would be sent to the iSCSI or NFS target inside the Controller VM's kernel. This write 650 would be intercepted by the I/O Director module 604 running in user space. I/O Director module 604 interprets the iSCSI LUN or the NFS file destination and converts the request into an internal "vDisk" request (e.g., as described in more detail below). Ultimately, the I/O Director module 604 would write the data to the object storage device 305 after translating the write request from a block-based format to an object-based format suitable for the object storage device 305.

In order to determine where to write data, the I/O Director module 604 communicates with a Distributed Metadata Service module 630 that maintains all the metadata in the block storage device 303. In some embodiments, the Distributed Metadata Service module 630 is a highly available, fault-tolerant distributed service that runs on all the Controller VMs in the remote storage environment as well as the controller VMs in the networked virtualization environment.

The Distributed Metadata Service module 630 stores the metadata that helps locate the actual content of each vDisk block. If no information is found in Distributed Metadata Service module 630 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Because the object storage devices are characterized by their high reliability, whereas the block storage devices suffer from lower reliability, the metadata maintained at the block storage devices is periodically snapshotted and stored at the object storage devices in case the block storage devices fail. By maintaining snapshots of the metadata as objects on the object storage devices, the state of metadata at the time of a snapshot may be recovered whenever the block storage device becomes unreliable.

Figure 7:
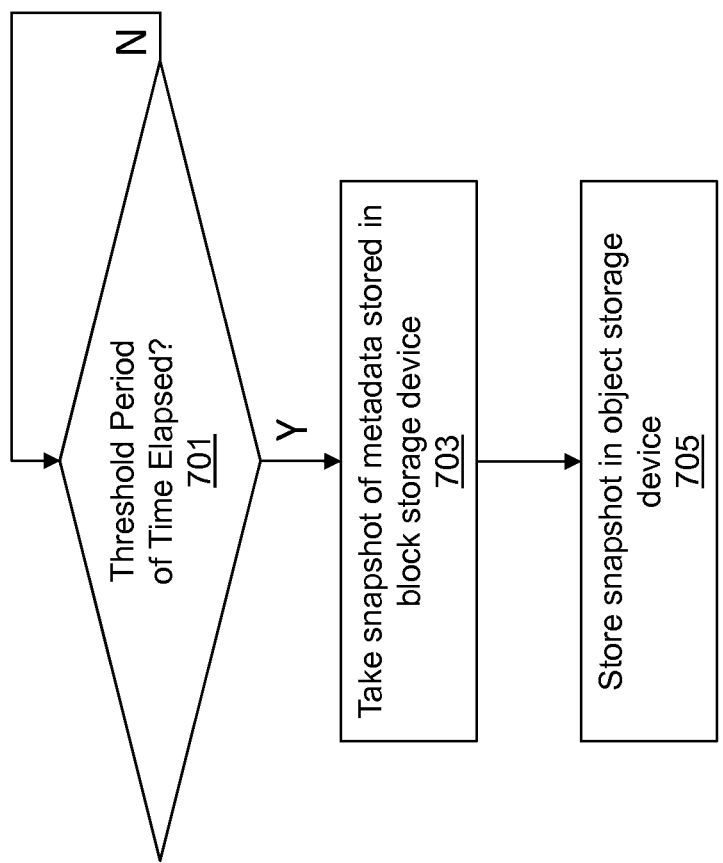
FIG. 7 is a flow diagram illustrating a method for maintaining snapshots of metadata stored on block storage devices of a remote storage environment according to some embodiments.

FIG. 7 is a flow diagram illustrating a method for maintaining snapshots of metadata stored on block storage devices of a remote storage environment according to some embodiments. Initially, a determination is made as to whether or not a threshold period of time has elapsed as shown at 701. The determination may be made by the controller VM deployed at the remote storage environment.

The threshold period of time may be set to any value. For example, a period may elapse every hour, every day, every week, etc. The period may be set to a shorter value when the importance of the data being maintained at the remote storage environment is greater and may be set to a greater value when the importance of the data being maintained at the remote storage environment is less.

If the threshold time period has yet to elapse, then the method returns to 701, where the controller VM waits until the threshold period of time elapses before proceeding.

If the threshold time period has already elapsed, then a snapshot of the metadata stored in the block storage device is taken as shown at 703. In some embodiments, the ability to take snapshots of a block storage device may already be present as a function of the remote storage environment, and the controller VM may simply request that the remote storage environment initiate the process of taking a snapshot. In other embodiments, the ability to take snapshots may not be natively available in the remote storage environment, and the controller VM may instead provide the functionality for taking snapshots.

Once the snapshot has been taken, it is stored at the object storage devices as shown at 705. In some embodiments, the remote storage environment may have the native functionality to convert a snapshot of metadata stored in a block storage format to an object storage device format. In other embodiments, the controller VM deployed at the remote storage environment may instead be provided with the functionality of converting a snapshot of metadata stored in a block storage format to an object storage device format.

Once a snapshot of the metadata is stored as an object on the object storage devices, the state of metadata at the time of the snapshot may be recovered whenever the block storage device becomes unreliable.

System Architecture

Figure 8:
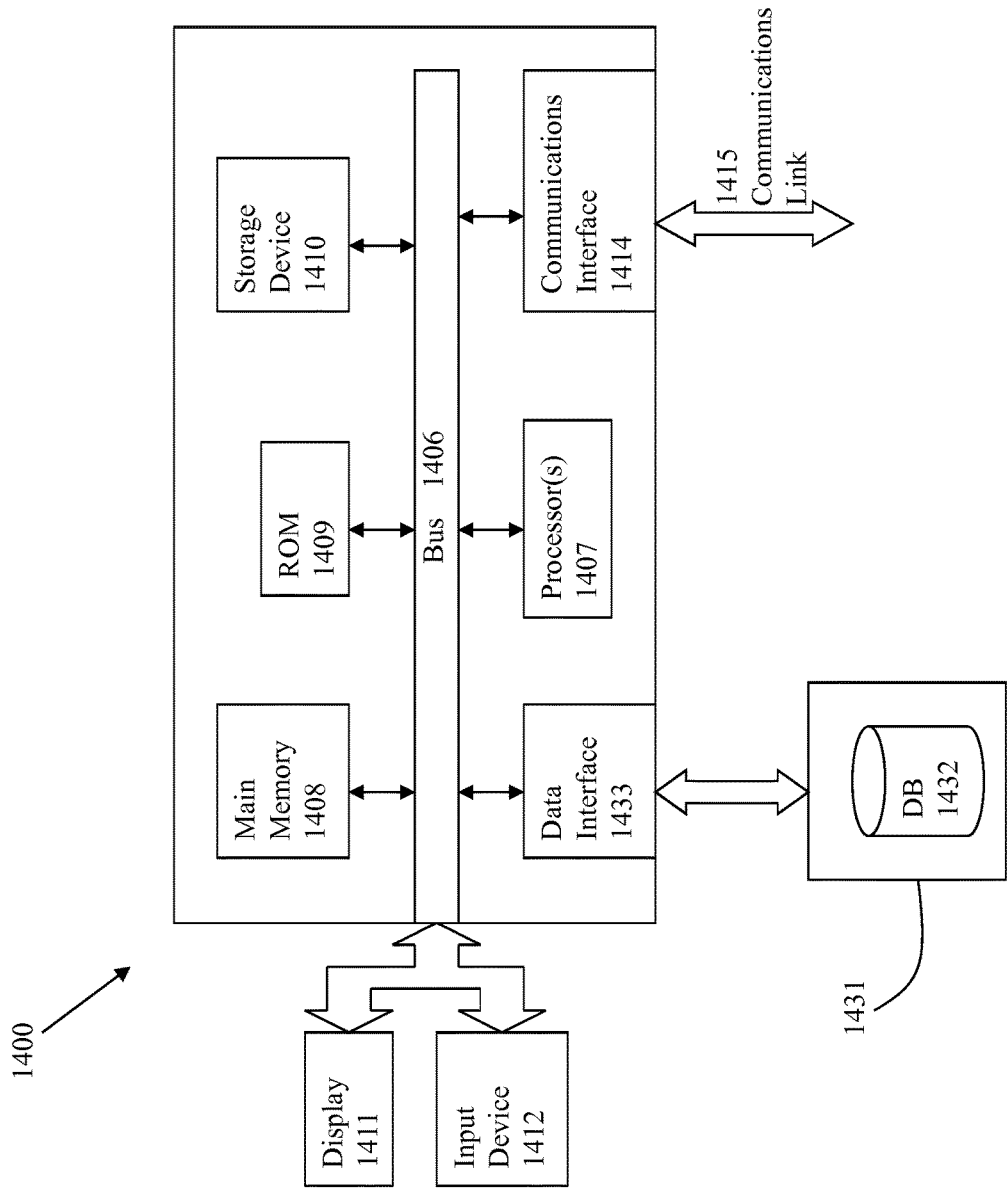
FIG. 8 is a block diagram of an illustrative computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for providing backup to a networked virtualization environment for storage management by a remote storage environment having a block storage device and an object storage device, comprising:
deploying a controller virtual machine on a first node from among a cluster of one or more nodes at the remote storage environment, the controller virtual machine being implemented as a storage controller on the first node to service storage requests from other nodes of the network virtualization environment, wherein the controller virtual machine provides a block storage device interface to the other nodes of the network virtualization environment for accessing an object storage device and a block storage device;
receiving, at the controller virtual machine, a given write request from a second node from among the other nodes of the network virtualization environment, the given write request comprising data in a block-based format and metadata associated with the given write request, wherein: (a) the data is to be written and (b) the metadata comprises a copy of at least some metadata maintained at the second node associated with the data to be written; and
implementing the given write request by:
(a) generating object data by translating the data or the given write request from the block-based format to an object-based format;
(b) writing the object data corresponding to the given write request to the object storage device; and
(c) writing the metadata corresponding to the given write request to the block storage device.

2. The method of claim 1, wherein the second node determines that the given write request should be replicated at the first node of the remote storage environment based on metadata at the second node.

3. The method of claim 1, wherein the given write request is initially in an NFS file format or a proprietary format.

4. The method of claim 1, wherein the controller virtual machine deployed at the remote storage environment fulfills multiple write requests in parallel.

5. The method of claim 1, wherein a curator module takes one or more actions to cures inconsistencies with the metadata using map reduce operations and one or more controller virtual machines at the remote storage environment maintain a copy of metadata for the networked virtualization environment.

6. The method of claim 1, wherein the metadata is maintained by a controller virtual machine of the networked virtualization environment to track and handle contents of vDisks, the vDisks corresponding to one or more blocks and to a virtual address spaces exposed as a disks to one or more virtual machines, wherein the controller virtual machine is located above a hypervisor on the second node.

7. The method of claim 1, wherein receiving the given write request further comprises:
receiving, at the controller virtual machine, the given write request that is directed to a iSCSI or NFS target;
intercepting the given write request to determine a iSCSI LUN file destination or a NFS file destination; and
converting the given write request into an internal vDisk request.

8. The method of claim 1, further comprising:
taking a snapshot of at least the metadata in the block storage device corresponding to the given write request;
generating object metadata by translating the snapshot of the metadata in the block storage device to an object-based format; and
storing the object metadata in the object storage device.

9. The method of claim 8, wherein the snapshot is taken after a threshold period of time has elapsed.

10. The method of claim 1, further comprising deploying one or more additional controller virtual machines at one or more additional nodes of the cluster of one or more nodes at the remote storage environment, wherein the controller virtual machine and the one or more additional controller virtual machines deployed at the remote storage environment provide backup functionality to a plurality of controller virtual machines residing at the networked virtualization environment on at least one of a one-to-one basis, a one-to-many basis, or a many-to-one basis.

11. The method of claim 10, wherein the metadata is maintained by distributed metadata service modules located above hypervisors in the networked virtualization environment to locate vdisk blocks corresponding to one or more vdisks.

12. The method of claim 10, wherein the controller virtual machine and the one or more additional controller virtual machines deployed at the remote storage environment provide backup functionality to the networked virtualization environment and one or more additional networked virtualization environments.

13. A computer program product embodied on a computer readable medium, the computer readable medium having stored thereon a sequence of instructions which, when executed by a processor causes the processor to execute a process for providing backup from a remote storage environment having a block storage device and an object storage device to a networked virtualization environment for storage management, the process comprising:
   deploying a controller virtual machine on a first node from among a cluster of one or more nodes at the remote storage environment, the controller virtual machine being implemented as a storage controller on the first node to service storage requests from other nodes of the network virtualization environment, wherein the controller virtual machine provides a block storage device interface to the other nodes of the network virtualization environment for accessing an object storage device and a block storage device;
   receiving, at the controller virtual machine, a given write request from a second node from among the other nodes of the network virtualization environment, the given write request comprising data in a block-based format and metadata associated with the given write request, wherein: (a) the data is to be written and (b) the metadata comprises a copy of at least some metadata maintained at the second node associated with the data to be written; and
   implementing the given write request by:
      (a) generating object data by translating the data or the given write request from the block-based format to an object-based format;
      (b) writing the object data corresponding to the given write request to the object storage device; and
      (c) writing the metadata corresponding to the given write request to the block storage device.

14. The computer program product of claim 13, wherein the second node determines that the given write request should be replicated at the first node of the remote storage environment based on metadata at the second node.

15. The computer program product of claim 13, wherein the given write request is initially in an NFS file format or a proprietary format.

16. The computer program product of claim 13, wherein the controller virtual machine deployed at the remote storage environment fulfills multiple write requests in parallel.

17. The computer program product of claim 13, wherein the metadata is maintained by distributed metadata service modules located above hypervisors in the networked virtualization environment to locate vdisk blocks corresponding to one or more vdisks.

18. The computer program product of claim 13, wherein a curator module takes one or more actions to cures inconsistencies with the metadata using map reduce operations and one or more controller virtual machines at the remote storage environment maintain a copy of metadata for the networked virtualization environment.

19. The computer program product of claim 13, wherein the metadata is maintained by a controller virtual machine of the networked virtualization environment to track and handle contents of vDisks, the vDisks corresponding to one or more blocks and to a virtual address spaces exposed as a disks to one or more virtual machines, wherein the controller virtual machine is located above a hypervisor on the second node.

20. The computer program product of claim 13, wherein the given write request in the block-based format is an iSCSI request.

21. The computer program product of claim 13, the process further comprising:
   taking a snapshot of at least the metadata in the block storage device corresponding to the given write request;
   generating object metadata by translating the snapshot of the metadata in the block storage device to an object-based format; and
   storing the object metadata in the object storage device.

22. The computer program product of claim 21, wherein the snapshot is taken after a threshold period of time has elapsed.

23. The computer program product of claim 13, the process further comprising deploying one or more additional controller virtual machines at one or more additional nodes of the cluster of one or more nodes at the remote storage environment, wherein the controller virtual machine and the one or more additional controller virtual machines deployed at the remote storage environment provide backup functionality to a plurality of controller virtual machines residing at the networked virtualization environment on at least one of a one-to-one basis, a one-to-many basis, or a many-to-one basis.

24. The computer program product of claim 23, wherein the controller virtual machine and the one or more additional controller virtual machines deployed at the remote storage environment provide backup functionality to the networked virtualization environment and one or more additional networked virtualization environments.

25. A system for providing backup from a remote storage environment having a block storage device and an object storage device to a networked virtualization environment for storage management, comprising:
   a computer processor to execute a set of program code instructions;
   a memory to hold the program code instructions, in which the program code instructions comprises program code to perform acts comprising:
   deploying a controller virtual machine on a first node from among a cluster of one or more nodes at the remote storage environment, the controller virtual machine being implemented as a storage controller on the first node to service storage requests from other nodes of the network virtualization environment, wherein the controller virtual machine provides a block storage device interface to the other nodes of the network virtualization environment for accessing an object storage device and a block storage device;
   receiving, at the controller virtual machine, a given write request from a second node from among the other nodes of the network virtualization environment, the given write request comprising data in a block-based format and metadata associated with the given write request, wherein: (a) the data is to be written and (b) the metadata comprises a copy of at least some metadata maintained at the second node associated with the data to be written; and
   implementing the given write request by:
      (a) generating object data by translating the data or the given write request from the block-based format to an object-based format;

(b) writing the object data corresponding to the given write request to the object storage device; and
(c) writing the metadata corresponding to the given write request to the block storage device.

26. The system of claim 25, wherein the second node determines that the given write request should be replicated at the first node of the remote storage environment based on metadata at the second node.

27. The system of claim 25, wherein the given write request is initially in an NFS file format or a proprietary format.

28. The system of claim 25, wherein the controller virtual machine deployed at the remote storage environment fulfills multiple write requests in parallel.

29. The system of claim 25, wherein the metadata is maintained by distributed metadata service modules located above hypervisors in the networked virtualization environment to locate vdisk blocks corresponding to one or more vdisks.

30. The system of claim 25, wherein a curator module takes one or more actions to cures inconsistencies with the metadata using map reduce operations and one or more controller virtual machines at the remote storage environment maintain a copy of metadata for the networked virtualization environment.

31. The system of claim 25, wherein the metadata is maintained by a controller virtual machine of the networked virtualization environment to track and handle contents of vDisks, the vDisks corresponding to one or more blocks and to a virtual address spaces exposed as a disks to one or more virtual machines, wherein the controller virtual machine is located above a hypervisor on the second node.

32. The system of claim 25, the acts further comprising deploying one or more additional controller virtual machines at one or more additional nodes of the cluster of one or more nodes at the remote storage environment, wherein the controller virtual machine and the one or more additional controller virtual machines deployed at the remote storage environment provide backup functionality to a plurality of controller virtual machines residing at the networked virtualization environment on at least one of a one-to-one basis, a one-to-many basis, or a many-to-one basis.

33. The system of claim 25, the acts further comprising:
taking a snapshot of at least the metadata in the block storage device corresponding to the given write request;
generating object metadata by translating the snapshot of the metadata in the block storage device to an object-based format; and
storing the object metadata in the object storage device.

34. The system of claim 33, wherein the snapshot is taken after a threshold period of time has elapsed.

35. The system of claim 32, wherein the controller virtual machine and the one or more additional controller virtual machines deployed at the remote storage environment provide backup functionality to the networked virtualization environment and one or more additional networked virtualization environments.

36. The system of claim 25, wherein the given write request in the block-based format is an iSCSI request.

* * * * *